United States Patent Office 2,809,093
Patented Oct. 8, 1957

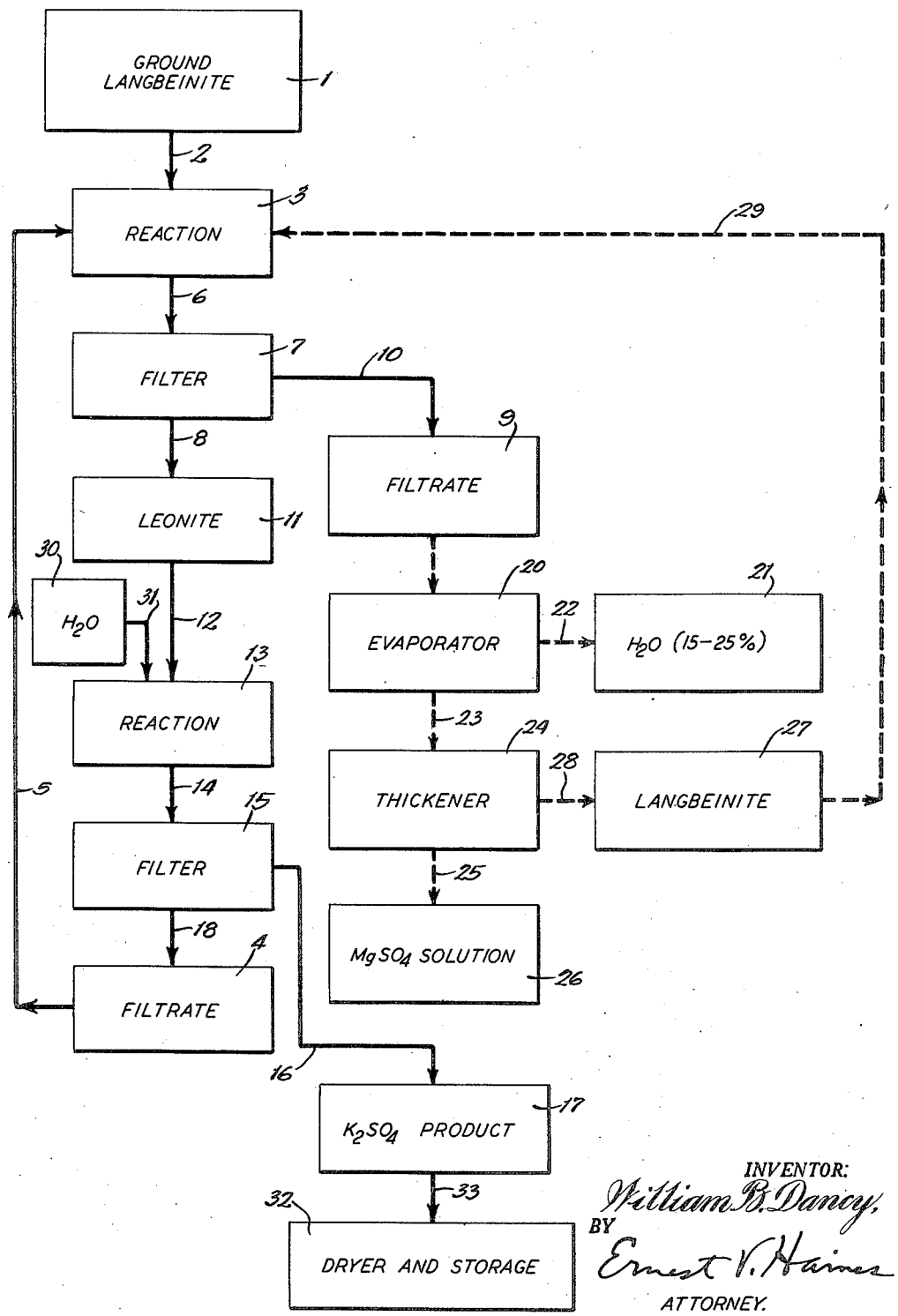

2,809,093

PRODUCTION OF POTASSIUM SULFATE FROM LANGBEINITE

William B. Dancy, Carlsbad, N. Mex., assignor to International Minerals & Chemical Corporation, a corporation of New York Application May 3, 1955, Serial No. 505,716

5 Claims. (Cl. 23—38)

This invention relates to the production of potassium sulfate from langbeinite ore and, more particularly, to the recovery of potash values from langbeinite ore in the form of potassium sulfate without the use of potassium chloride.

Langbeinite is a double salt of potassium sulfate and magnesium sulfate containing 2 molecules of the latter for each molecule of the former. Heretofore, the potash values in langbeinite ore have been recovered by reacting langbeinite with an aqueous solution of potassium chloride to produce potassium sulfate. The potassium sulfate was crystallized from the solution and recovered, for example by filtration. The potassium sulfate mother liquor could then be processed by one or another procedure to recover the magnesium values therefrom. This process for recovering potash values from langbeinite requires a high purity potassium chloride, which is expensive. A process capable of recovering the potash values from langbeinite ore without the use of any potassium chloride whatsoever would have obvious economic advantages.

It is an object of this invention to recover the potash values from langbeinite ore without using potassium chloride.

It is another object of this invention to recover the potash values in the form of potassium sulfate from langbeinite ore.

It is a further object of this invention to recover the potash values of langbeinite ore as potassium sulfate which is virtually free of chloride contamination.

Another object of this invention is to provide a simple commercially feasible process for recovering the potash values from langbeinite ore and to produce as a co-product a concentrated magnesium sulfate solution which can be evaporated directly for the production of plant food grade magnesium sulfate or further processed to produce other useful magnesium and sulfate by-products.

In accordance with this invention, langbeinite ore is treated with potassium sulfate mother liquor at a temperature between about 35° C. and about 75° C. until the reaction has reached substantial equilibrium. Leonite formed during the reaction is separated, for example by filtration, and treated with water at a temperature between about 30° C. and about 65° C. until the reaction mixture reaches substantial equilibrium. Potassium sulfate which crystallizes from the reaction mixture is separated and recovered by any convenient means.

In accordance with one embodiment of this invention, langbeinite ore which has been ground to a mesh size of about 200 (preferably, at least 90% should pass through a 200 mesh screen) is agitated with a potassium sulfate mother liquor at a temperature between about 35° C. and about 75° C. until the reaction reaches equilibrium. The potassium sulfate mother liquor is exemplified by the mother liquor remaining following the crystallization and separation of potassium sulfate crystals from an aqueous reaction mixture containing magnesium sulfate and potassium sulfate. Preferably, the mother liquor will have a magnesium sulfate:water ratio as high as possible. The mother liquor may contain small and varying amounts of sodium chloride, but the concentration of sodium chloride must be less than about 2% if efficient operation of the process and good recoveries are desired. The potassium sulfate mother liquor will always have a potassium sulfate:magnesium sulfate ratio of between about 1:1 and about 1:2.

The reaction mixture containing the ground langbeinite and potassium sulfate mother liquor is agitated and allowed to react at a temperature between about 35° C. and about 75° C., preferably at a temperature between about 45° C. and about 60° C. until substantial equilibrium is produced. Usually this will take at least about 3 hours. The reaction is preferably carried out over a period of time between about 3 hours and about 5 hours. Upon completion of the reaction, leonite crystals which are formed during the reaction are separated by any convenient means, for example, by filtration. Leonite ($K_2SO_4 \cdot MgSO_4 \cdot 4H_2O$) is produced during the reaction if the temperature is maintained above about 50° C. If the reaction is carried out at a temperature below about 50° C., schoenite ($K_2SO_4 \cdot MgSO_4 \cdot 6H_2O$) will be formed in place of leonite. In either case, the crystals which are formed are separated by any convenient means, for example by filtration. The filtrate remaining, following the separation of the leonite or schoenite, may be processed to recover the magnesium values therefrom. Handling the filtrate in this manner, that is, by ignoring the potash values in the filtrate, results in a 60% to 70% recovery as potassium sulfate of the potash values in the langbeinite feed. The yield of potash values can be considerably improved by treating the filtrate from the aforesaid leonite or schoenite producing reaction in a manner to be described below.

The leonite or schoenite crystals after separation from the reaction mixture are treated with water at a temperature between about 30° C. and about 65° C. to produce potassium sulfate. Preferably, the reaction is carried out at a temperature between about 45° C. and about 55° C. Sufficient water is added for the reaction to produce a magnesium sulfate:water ratio as high as possible. The potassium sulfate crystals produced are separated from the reaction mixture by any convenient means, for example by filtration. The leonite or schoenite reaction to produce potassium sulfate is carried out until substantial equilibrium conditions are produced, usually for between about ½ hour and about 1 hour. Following the separation of the potassium sulfate crystals, the mother liquor remaining may be recycled and reacted with ground langbeinite to produce leonite or schoenite as described above.

In accordance with another embodiment of this invention, the mother liquor remaining after the separation of leonite or schoenite, as the case may be, is treated to recover the potassium values as potassium sulfate. This embodiment comprises evaporating the filtrate to a weight of about 85% of the original.

The evaporated filtrate is then transferred to a thickening apparatus maintained at a temperature of about 90° C. and allowed to settle. The overflow from the thickener comprises a magnesium sulfate solution which may be further processed to recover the magnesium values therefrom or to convert the magnesium sulfate to other valuable by-products. The underflow from the thickener is a slurry, the solid phase of which contains essentially langbeinite and the liquid phase is a saturated magnesium sulfate solution. This langbeinite slurry is recycled to the station in the process where ground langbeinite is reacted with potassium sulfate mother liquor to produce leonite. The recycling of this langbeinite slurry results in a substantial increase in the recovery of the potash values from the initial langbeinite ore used as a starting material. By recycling this langbeinite slurry to recover the potash values therefrom in the form of potassium sulfate, the potash recovery amounts to about 85% of the potash content of the langbeinite starting material.

The process of this reaction can be better understood by referring to the figure which shows a flow sheet of the process. In the flow sheet ground langbeinite 1 is transferred to a reaction tank 3 by line 2 where it is reacted at a temperature, preferably between about 50° C. to about 60° C., with a potassium sulfate mother liquor 4 entering the reaction tank 3 by line 5. Potassium sulfate mother liquor from any suitable source may be utilized. After the reaction has been initiated and the whole process is proceeding on a continuous basis, additional langbeinite 27, produced in a subsequent step in the process, is added to reaction tank 3 by line 29. By recycling langbeinite slurry 27 to reaction tank 3, the potash recoveries of the process are increased by about 10% or more. The reaction product mixture from the reaction tank 3 is transferred to filter 7 by line 6. Filtrate 9 from filter 7 is removed by line 10 and in accordance with one embodiment of the invention can be sent to a by-product recovery section. Leonite crystals separated from its mother liquor on filter 7 are removed by line 8 and sent to reaction tank 13 by line 12. Water 30 is added to reaction tank 13 by line 31, the water being added in an amount of about 80%, by weight, of the leonite entering the reaction tank. The reaction of the leonite and water is allowed to proceed to substantial equilibrium over a period of between about ½ hour to about 2 hours at a temperature from between about 30° C. to about 65° C. The potassium sulfate crystals formed by the reaction of leonite and water is transferred to filter 15 by line 14 and potassium sulfate 17 is removed from filter 15 by line 16 and sent to drying and storage 32 by line 33. The filtrate 4 is removed from filter 15 by line 18 and recycled to reaction tank 3. Filtrate 4 is a potassium sulfate mother liquor which upon reaction with langbeinite in reaction tank 3 produces leonite.

In accordance with a specific embodiment of this invention, filtrate 9 is treated to recover the potash values therefrom in the form of potassium sulfate. In this embodiment filtrate 9 is evaporated in evaporator 20 to remove between about 15% and about 25% of the water present. The evaporated liquor is transferred to thickener 24 by line 23. The evaporated liquor is allowed to stand, preferably at a temperature of above about 80° C., and more preferably, at a temperature of about 90° C., until equilibrium is substantially attained, usually about one hour. Langbeinite 27 is formed during the settling period and is removed in the underflow from the thickener by line 28 as a slurry of langbeinite solids in a concentrated magnesium sulfate solution. The langbeinite slurry 27 is recycled to reaction tank 3 by line 29. The overflow from thickener 24 comprising a saturated magnesium sulfate solution 26 is removed by line 25.

EXAMPLE

A potassium sulfate mother liquor was charged into a reaction vessel along with a langbeinite slurry and agitated at a temperature of about 55° C. for about 3 hours. The potassium sulfate mother liquor and langbeinite slurry had compositions as shown in Table I.

Table I

|  | K | Mg | Na | Cl | SO$_4$ | H$_2$O | Total |
|---|---|---|---|---|---|---|---|
| K$_2$SO$_4$ mother liquor (4) | 45.08 | 26.19 | None | None | 158.78 | 539.74 | 769.79 |
| Langbeinite slurry (27) | 65.56 | 47.39 | 5.36 | 8.28 | 267.75 | 72.96 | 467.35 |

At the end of this time the reaction mixture had reached substantial equilibrium. The reaction product mixture was filtered to separate leonite crystals which had formed during the reaction. The filtrate, herein referred to as "leonite mother liquor," obtained was treated as hereinafter described. The filtrate and leonite cake had analyses as shown in Table II.

Table II

|  | K | Mg | Na | Cl | SO$_4$ | H$_2$O | Total |
|---|---|---|---|---|---|---|---|
| Filtrate (9) | 24.04 | 45.88 | 5.36 | 8.28 | 210.77 | 535.15 | 829.50 |
| Leonite cake | 86.60 | 27.69 | None | None | 215.76 | 147.20 | 477.29 |

The leonite crystals were mixed with water in an amount of about 0.8 parts of water per part of leonite and agitated at a temperature of about 47° C. until the reaction mixture attained substantial equilibrium. This required about ½ hour. The reaction mixture had the composition shown in Table III.

Table III

| K | Mg | Na | Cl | SO$_4$ | H$_2$O | Total |
|---|---|---|---|---|---|---|
| 86.60 | 27.68 | None | None | 215.76 | 539.74 | 869.83 |

During the reaction of leonite with water, potassium sulfate crystals precipitated. These were removed by filtration. The potassium sulfate filter cake and potassium sulfate mother liquor had the following analyses:

Table IV

|  | K | Mg | Na | Cl | SO$_4$ | H$_2$O | Total |
|---|---|---|---|---|---|---|---|
| Cake | 41.52 | 1.50 | None | None | 56.98 | 17.64 | 117.64 |
| Filtrate | 45.08 | 26.19 | None | None | 158.78 | 539.74 | 769.78 |

The potassium sulfate mother liquor had a potassium sulfate: magnesium sulfate ratio between about 1:1 and about 1:2 and was suitable for recycling to the initial reaction vessel for reaction with ground langbeinite to produce leonite.

The "leonite mother liquor" remaining following the removal of leonite crystals from the reaction product mixture in the initial reaction vessel was evaporated to remove 194.18 parts of water. The evaporated filtrate was then transferred to a thickening device and was maintained at about 90° C. until substantial equilibrium was attained. This required about 1 hour and during this time langbeinite settled out. The underflow from the thickener comprised a langbeinite slurry in a concentrated magnesium sulfate solution and was suitable for recycling to the initial reaction vessel to be reacted with potassium sulfate mother liquor and fresh ground langbeinite to produce leonite. The langbeinite slurry had the composition shown in Table V.

Table V

| K | Mg | Na | Cl | SO$_4$ | H$_2$O | Total |
|---|---|---|---|---|---|---|
| 16.89 | 17.12 | 1.15 | 1.77 | 88.39 | 72.96 | 198.28 |

By recycling this langbeinite slurry to the initial reaction vessel, 85% of the potash values in the fresh langbeinite added to the process operating on a continuous basis can be recovered in the form of potassium sulfate. The overflow from the thickener in which langbeinite is precipitated is a saturated magnesium sulfate solution which may be treated to recover the magnesium or sulfate values or may be processed to produce sodium sulfate. The overflow liquor had the composition shown in Table VI.

Table VI

| K | Mg | Na | Cl | SO$_4$ | H$_2$O | Total |
|---|---|---|---|---|---|---|
| 7.16 | 28.76 | 4.20 | 6.51 | 122.38 | 268.02 | 437.02 |

Having thus fully described and illustrated the character of the instant invention, what is desired to be secured by Letters Patent is:

1. A process for recovering potash values from langbeinite ore which comprises reacting langbeinite with a potassium sulfate mother liquor at a temperature between about 35° C. and about 75° C. until the reaction reaches substantial equilibrium, whereby a solid phase is obtained consisting essentially of a hydrate of $$K_2SO_4 \cdot MgSO_4$$

separating said solid-phase K$_2$SO$_4$.MgSO$_4$ hydrate from the reaction mixture, treating said K$_2$SO$_4$.MgSO$_4$ hydrate with water at a temperature between about 30° C. and about 65° C. until the reaction reaches substantial equilibrium, whereby a solid phase is obtained consisting essentially of potassium sulfate, separating said solid-phase potassium sulfate from the reaction mixture, recycling the potassium sulfate mother liquor to said reaction with langbeinite, evaporating the K$_2$SO$_4$.MgSO$_4$ hydrate mother liquor to reduce its weight by between about 15% and about 25%, maintaining the evaporated mother liquor at a temperature of at least about 80° C. until it reaches substantial equilibrium, whereby langbeinite separates therefrom as a solid phase, separating said solid-phase langbeinite from the evaporated mother liquor, and recycling the langbeinite to said reaction of langbeinite with potassium sulfate mother liquor.

2. The process of claim 1 in which the K$_2$SO$_4$.MgSO$_4$ hydrate is reacted with water in an amount of about 0.8 part water per part of K$_2$SO$_4$.MgSO$_4$ hydrate.

3. A process for recovering potash values from langbeinite ore which comprises reacting langbeinite with a potassium sulfate mother liquor at a temperature between about 35° C. and about 75° C. for between about ½ hour and about 2 hours, whereby a solid phase is obtained consisting essentially of a hydrate of K$_2$SO$_4$.MgSO$_4$ separating said solid-phase K$_2$SO$_4$.MgSO$_4$ hydrate from the reaction mixture, treating said K$_2$SO$_4$.MgSO$_4$ hydrate with water at a temperature between about 30° C. and about 65° C. for between about 3 hours and about 5 hours, whereby a solid phase is obtained consisting essentially of potassium sulfate, separating said solid-phase potassium sulfate from the reaction mixture, recycling the potassium sulfate mother liquor to said reaction with langbeinite, evaporating the K$_2$SO$_4$.MgSO$_4$ hydrate mother liquor to reduce its weight by between about 15% and about 25%, maintaining the evaporated mother liquor at a temperature of at least about 80° C. until it reaches substantial equilibrium, whereby langbeinite separates therefrom as a solid phase, separating said solid-phase langbeinite from the evaporated mother liquor, and recycling the langbeinite to said reaction of langbeinite with potassium sulfate mother liquor.

4. The process of claim 1 in which 90% of the langbeinite has a mesh size of less than 200 mesh.

5. A process for recovering potash values from langbeinite ore which comprises reacting langbeinite with a potassium sulfate mother liquor at a temperature between about 45° C. and about 60° C. until the reaction reaches substantial equilibrium, whereby a solid phase is obtained consisting essentially of a hydrate of $$K_2SO_4 \cdot MgSO_4$$

separating said solid-phase K$_2$SO$_4$.MgSO$_4$ hydrate from the reaction mixture, treating said K$_2$SO$_4$.MgSO$_4$ hydrate with water at a temperature between about 45° C. and about 55° C. until the reaction reaches substantial equilibrium, whereby a solid phase is obtained consisting essentially of potassium sulfate, separating said solid-phase potassium sulfate from the reaction mixture, recycling the potassium sulfate mother liquor to said reaction with langbeinite, evaporating the K$_2$SO$_4$.MgSO$_4$ hydrate mother liquor to reduce its weight by between about 15% and about 25%, maintaining the evaporated mother liquor at a temperature of at least about 80° C. until it reaches substantial equilibrium, whereby langbeinite separates therefrom as a solid phase, separating said solid-phase langbeinite from the evaporated mother liquor, and recycling the langbeinite to said reaction of langbeinite with potassium sulfate mother liquor.

References Cited in the file of this patent

UNITED STATES PATENTS 1,939,174    Kaselitz _____ Dec. 12, 1933

OTHER REFERENCES

Mellor: "Comprehensive Treatise on Inorganic and Theoretical Chemistry," vol. 4, pages 338, 339, 340, Longmans-Green and Co., New York, 1923.